United States Patent [19]

Gogush

[11] 3,924,889
[45] Dec. 9, 1975

[54] ELEVATING MECHANISM FOR THE ROOFS OR TOPS OF VANS AND THE LIKE

[76] Inventor: Michael Gogush, 7101 Robin Blvd., R.R. No. 1, Headingly, Manitoba, Canada

[22] Filed: Jan. 3, 1975

[21] Appl. No.: 538,369

[30] Foreign Application Priority Data
Feb. 27, 1974 Canada ............................ 193602

[52] U.S. Cl. .................. 296/137 B; 52/66; 296/26
[51] Int. Cl.² ............................................. B60J 7/08
[58] Field of Search .......... 296/26, 27, 23 C, 137 B, 296/137 R, 109, 123, 23 R, 23 MC; 52/66, 67; 135/4 A, 1 A

[56] References Cited
UNITED STATES PATENTS

| | | | |
|---|---|---|---|
| 3,506,299 | 4/1970 | Arnold et al............................ | 52/66 |
| 3,514,148 | 5/1970 | Hunter et al.......................... | 296/27 |
| 3,770,314 | 11/1973 | Borskey ................................ | 296/26 |
| 3,823,974 | 7/1974 | Patnode................................. | 135/4 A |

*Primary Examiner*—Frank E. Werner
*Assistant Examiner*—Gary Auton
*Attorney, Agent, or Firm*—Stanley G. Ade

[57] ABSTRACT

Normally, roofs on tops of vehicles such as campers or the like, are lowered for travelling in order to decrease wind resistance and are then raised an amount to provide more head room inside when parked and set up for use. Various mechanisms are provided for this action such as telescopic guides, long lever arms which extend downwardly of the sides and can cause injury and pulley and cable assemblies. All of these are complicated and are easily disabled due to the relatively large number of parts involved and the distances over which they must operate. The present device comprises a compact linkage on either side extending between the upper edges of the vehicle and the roof panel, said linkage being easily operated by electrical, mechanical or fluid operating means. By providing a novel sliding mounting for the lower ends of the crank arm, the roof panel can raise and lower vertically taking with it the enclosing canvas walls which are secured to the boundaries of the roof opening and to adjacent the edges of the roof panel.

8 Claims, 2 Drawing Figures

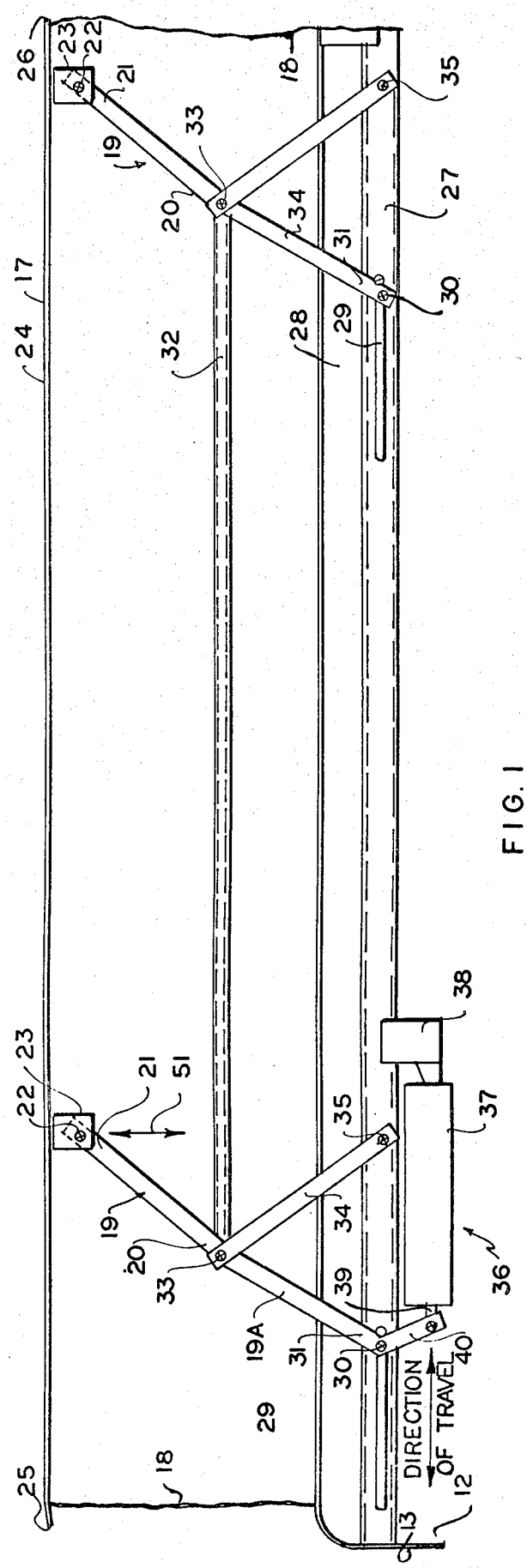
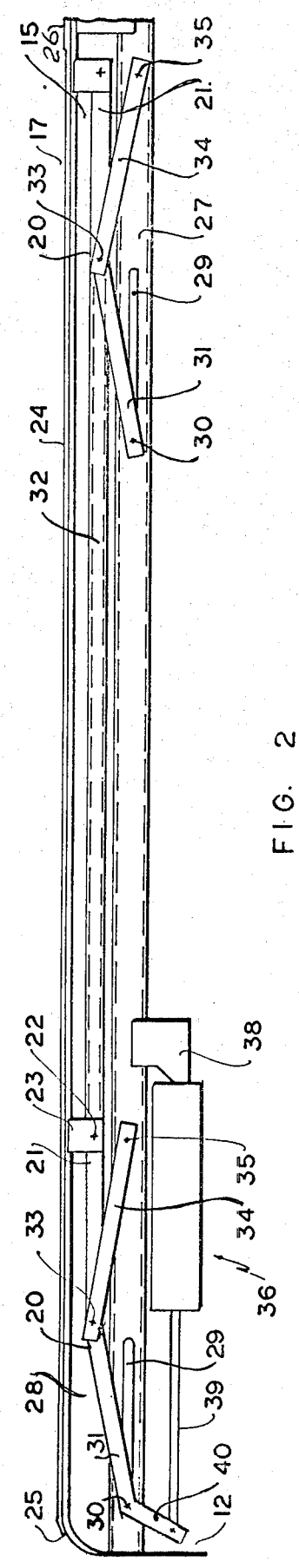
FIG. 1
FIG. 2

ELEVATING MECHANISM FOR THE ROOFS OR TOPS OF VANS AND THE LIKE

BACKGROUND OF THE INVENTION

The present invention relates to new and useful improvements in campers or van bodies which include a roof panel which can be lowered for travelling and raised for use in order to provide additional head room inside the body.

Such devices normally include either solid surrounding walls extending downwardly from the roof panel which engage with the walls of the vehicle body in a telescopic manner or, alternatively, a flexible canvas surrounding wall which collapses when the panel lowers and extends when the panel is raised.

The conventional means for raising and lowering the roof panel include telescopic guides, cables and pulley assemblies, or relatively long links which are pivotted to the sides of the body and extend downwardly towards the lower ends thereof for easy access in order to raise and lower the roof panel.

The principal disadvantage of conventional systems includes the relatively long distances over which the various means must operate, particularly if they are manually operated, and the fact that they are relatively involved and the slightest misalignment causes them to jam. Also, the devices which utilize the relatively long spring counterbalance levers can readily become dangerous and cause injury to the operator or to children due to the exposed nature of such linkage.

SUMMARY OF THE INVENTION

The present invention overcomes these disadvantages and provides a linkage system which is compact and which can be operated electrically, mechanically or hydraulically as desired.

The principal object and essence of the invention is to provide a device of the character herewithin described which includes a pair of crank arms pivotally connected between the roof panel and the upper side edges of the body and which include novel means so that the roof panel raises and lowers vertically.

Another object of the invention is to provide a device of the character herewithin described which, when used with flexible canvas walls, permits fairly wide tolerances in the adjustment of the linkage without interfering with the efficient operation thereof.

A still further object of the invention is to provide a device of the character herewithin described which is particularly suited for use with a fluid operator driven by an hydraulic pump which in turn may be connected to the 12-volt battery normally provided on such vehicles.

A still further object of the invention is to provide a device of the character herewithin described which is situated adjacent the upper edges of the side panels and is therefore not readily accessible to children.

Still another object of the invention is to provide a device of the character herewithin described which is extremely simple in construction, economical in operation and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a fragmentary side elevation of the upper portion of the vehicle showing the roof panel in the raised position.

FIG. 2 is a view similar to FIG. 1, but showing the roof panel in the closed position.

In the drawings like characters of reference indicate corresponding parts in the different figures.

DETAILED DESCRIPTION

Figure 3:
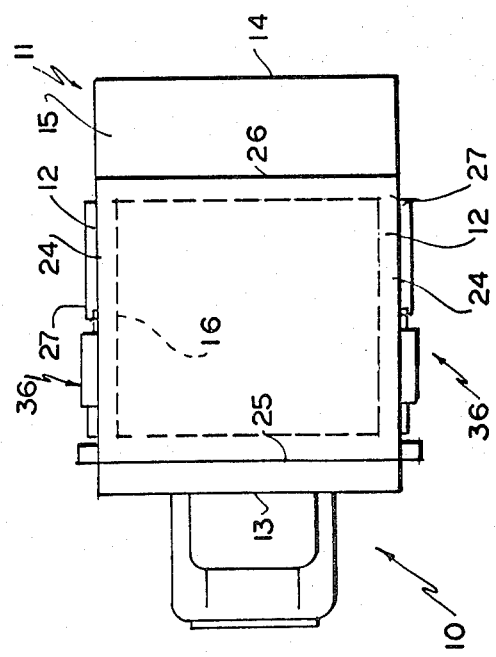
FIG. 3 is a partially schematic view, reduced in size with reference to FIGS. 1 and 2, showing a plan view of the vehicle.

Proceeding therefore to describe the invention in detail, reference should be made to the accompanying drawings in which a vehicle 10 is shown schematically in FIG. 3. This vehicle includes a vehicle body collectively designated 11, having side panels 12, a front wall 13 and a rear wall 14.

A roof 15 covers the enclosure formed by the walls and a substantially rectangular roof opening 16 is formed in this roof.

A substantially rectangular roof panel 17 closes this opening when in the lowered position shown in FIG. 1 and the necessary seals (not illustrated) are provided. However, these are conventional, it is not believed necessary to describe same further.

In order to reduce wind resistance and to maintain the centre of gravity of the vehicle within desirable limits, the height of the vehicle body is not sufficient for the average adult to stand erect therein.

The roof panel 17 is therefore provided with means to elevate same above the roof 15, into the position shown in FIG. 1 thus giving sufficient head room between the roof panel and the floor of the vehicle within the area designed by the boundaries of the opening 16 formed in the roof 15.

In the present embodiment, canvas walls 18 extend between adjacent the perimeter of the roof panel 17 and the boundaries around the roof opening 16 and when in the elevated position shown in FIG. 1, these walls are extended thus enclosing the volume within the roof panel and the roof 15. When in the closed position shown in FIG. 2, these walls collapse and telescope in the usual manner.

Alternatively, the walls 18 could be made of a solid material and telescopically engaged within the vehicle body.

Means are provided to raise and lower the roof panel 17 from the position shown in FIG. 1 to the position shown in FIG. 2 or vice-versa.

A pair of crank arms 19 is provided on one side and a similar pair (not illustrated) is provided on the opposite side.

Each pair of crank arms includes an arm 19A which is angulated intermediate the ends thereof as indicated by reference character 20. The upper ends 21 of each of the crank arms is pivotally connected by means of a pivot 22, to a bracket 23 secured to the outer side edges 24 of the roof panel and the crank arms of each pair are in spaced relationship one from the other, one being adjacent the front edge 25 of the roof panel and the other being adjacent the rear edge 26 thereof.

A length of rectangular tubing or the like indicated by reference character 27, is secured adjacent the upper edge 28 of the side walls 12 of the vehicle body and this length of rectangular tubing runs substantially parallel to the upper edge 28.

Longitudinally extending slots 29 are formed through the outer wall of this rectangular tubing and a pivot 30 engages this slot an also engages the lower end 31 of the crank arms 19A as clearly shown.

A link 32 is situated substantially parallel to the upper edge 28 of the vehicle body sides 12 and is pivotally connected by the ends thereof to adjacent the points 20 intermediate the ends of the crank arms, said pivotal connection being indicated by means of pivot pins 33. This ensures that both crank arms operate together when the roof panel 17 is raised and lowered.

An anchor link 34 is also pivotted by the upper end thereof to pivot 33 and by the lower end thereof to the rectangular tubing 27, by means of pivot pin 35 and these pivot pins 35 are spaced from the slots 29 as clearly shown in FIG. 2.

Means are provided to raise and lower the roof panel relative to the roof 15 which in this embodiment, take the form of fluid operators collectively designated 36. However, it will be appreciated that an electric motor or other mechanical means could be utilized to operate the linkage.

The fluid operator includes cylinders 37 anchored by one end thereof to brackets 38 which in turn are secured to the rectangular tubing 27. The cylinders lie parallel with the rectangular tubing 27 and the piston rod 39 extends from the cylinder and is pivotally connected to an angulated extension 40 of the crank arms 19A. This angulated extension extends beyond the end 31 of the crank arm as clearly illustrated and it will be noted that a fluid operator 36 is used for the linkage on either side of the body but is only connected to only one crank arm of each pair.

Figure 4:
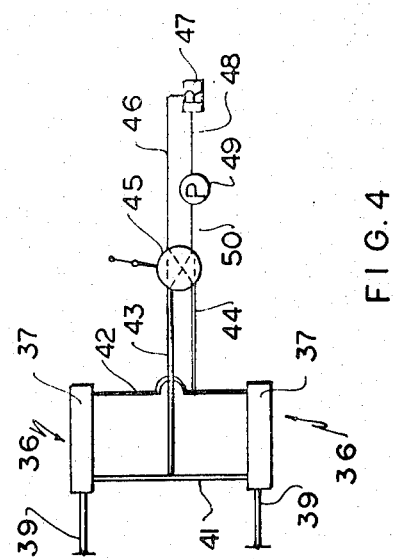
FIG. 4 is a schematic diagram of the hydraulic system.

FIG. 4 shows one method of connecting the fluid operators 36 so that the pressure generated by each is equal. A conduit extends between the front ends of the pistons 37 as indicated by reference character 41 and a further conduit 42 extends between the rear ends of the cylinders 36.

Conduits 43 and 44 extend from conduits 41 and 42 respectively, to an operating valve 45 and a further conduit 46 extends from the valve to a reservoir 47. Conduit 48 extends from the reservoir to a pump 49 and a further conduit 50 extends from the pump back to the valve 45. The valve is conventional and the routing of the fluid is shown by dotted lines within the schematic of the valve 45.

When in one position, the pump which may be operated by an electric motor driven from the 12-volt battery (not illustrated) forces fluid either to conduit 41 or 42 and the pressure of this fluid within the fluid operators 36 is of course balanced automatically.

When in the position shown in FIG. 2, the valve 45 is set so that fluid under pressure enters the cylinders from conduit 41 thus driving the pistons and piston rods rearwardly and pivotting the crank arms so that the roof panel 17 is elevated to the position shown in FIG. 1. By reversing the valve, fluid is routed through conduit 42 thus extending the piston rods and lowering the roof panel to the position shown in FIG. 1.

The anchor link 34 controls the action of the crank arms and the sliding pivots 30 at the lower ends of the crank arms move along the closed ended slots 29 thus allowing the upper ends together with the roof panel to move substantially vertically in the direction of double-headed arrow 51.

This provides an extremely compact and efficient linkage system readily adapted for operation by hydraulics, which will raise and lower the panel 17 readily and easily.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a vehicle body which includes a pair of spaced and parallel side walls, a rear wall and a front wall forming an enclosure, and a roof for said enclosure, a substantially rectangular opening formed in said roof, a substantially rectangular roof panel having a pair of spaced and parallel sides and a front edge and a rear edge, flexible wall means extending from the boundaries of said opening in said roof, to the sides and edges of said panel whereby said panel can be moved substantially vertically from the closed position covering said opening, to the raised position whereby said panel is spaced vertically above said opening with said flexible walls extended; means to raise and lower said roof panel relative to said roof, said means including at least two pairs of crank arms, one pair being pivotally connected by the upper ends thereof in spaced apart relation to one side of said roof panel, the other pair being similarly connected to the opposite side of said roof panel, link means pivotally connected by the ends thereof to the crank arms of each of said pairs intermediate the ends of the crank arms, said one pair of crank arms being pivotally connected by the other ends thereof to adjacent the upper edges of the side walls of said vehicle, the said other pair of crank arms being similarly connected to the other side wall of said vehicle adjacent the upper edge thereof, anchor link means pivotally secured by one end thereof to adjacent said upper side edges of said side walls spaced from said other ends of said crank arms, and by the other end thereof to the point of pivotal connection of said link means to said crank arms and means mounting said other ends of said crank arms to said side walls for longitudinal sliding movement whereby said roof panel raises and lowers substantially vertically relative to said vehicle, an extension formed on said other ends of at least one of said pairs of crank arms and a source of power being operatively connected to said extensions.

2. The invention according to claim 1 in which said means mounting said other ends of said crank arms includes closed ended longitudinally extending slots in said side walls, said ends of said crank arms being pivotally mounted in said slots for pivotal action and longitudinal sliding movement.

3. The invention according to claim 1 in which said source of power takes the form of a fluid operator mounted on said side walls and being operatively connected to said extension.

4. and invention according to claim 2 in which said source of power takes the form of a fluid operator mounted on said side walls and being operatively connected to said extension.

5. A vehicle body including in combination a pair of spaced and parallel side walls, a rear wall and a front wall forming an enclosure, and a roof for said enclosure, a substantially rectangular opening formed in said roof, a substantially rectangular roof panel having a pair of spaced and parallel sides and a front edge and a rear edge, flexible wall means extending from the boundaries of said opening in said roof, to the sides and edges of said panel whereby said panel can be moved substantially vertically from the closed position covering said opening, to the raised position whereby said panel is spaced vertically above said opening with said flexible walls extended, means to raise and lower said roof panel relative to said roof, said means including at least two pairs of crank arms, one pair being pivotally connected by the upper ends thereof in spaced apart relation to one side of said roof panel, the other pair being similarly connected to the opposite side of said roof panel, link means pivotally connected by the ends thereof to the crank arms of each of said pairs intermediate the ends of the crank arms, said one pair of crank arms being pivotally connected by the other ends thereof to adjacent the upper edges of the side walls of said vehicle, the said other pair of crank arms being similarly connected to the other side wall of said vehicle adjacent the upper edge thereof, anchor link means pivotally secured by one end thereof to adjacent said upper side edges of said side walls spaced from said other ends of said crank arms, and by the other end thereof to the point of pivotal connection of said link means to said crank arms, and means mounting said other ends of said crank arms to said side walls for longitudinal sliding movement whereby said roof panel raises and lowers substantially vertically relative to said vehicle an extension formed on said other ends of at least one of said pairs of crank arms and a source of power being operatively connected to said extension.

6. The vehicle according to claim 5 in which said means mounting said other ends of said crank arms including closed ended longitudinally extending slots in said side walls, said ends of said crank arms being pivotally mounted in said slots for pivotal action and longitudinal sliding movement.

7. The invention according to claim 5 in which said source of power takes the form of a fluid operator mounted on said side walls and being operatively connected to said extension.

8. The invention according to claim 6 in which said source of power takes the form of a fluid operator mounted on said side walls and being operatively connected to said extension.

* * * * *